United States Patent [19]

Panella

[11] Patent Number: 5,038,829
[45] Date of Patent: Aug. 13, 1991

[54] SEWER LINE CLEAN OUT UNITS

[76] Inventor: Paul Panella, Rte. 1 - Box 72A, Accident, Md. 21520

[21] Appl. No.: 301,893

[22] Filed: Jan. 26, 1989

Related U.S. Application Data

[63] Continuation-in-part of Ser. No. 257,870, Oct. 14, 1988, abandoned.

[51] Int. Cl.⁵ .............................................. F16L 55/10
[52] U.S. Cl. .................................. 138/89; 138/96 T; 4/295
[58] Field of Search .................... 138/89, 96 R, 96 T, 138/109, 128; 215/367, 369; 277/208; 4/295, 255

[56] References Cited

U.S. PATENT DOCUMENTS

| | | | |
|---|---|---|---|
| 2,826,222 | 3/1958 | Case | 138/96 T |
| 2,873,765 | 2/1959 | Gregory | 138/96 T |
| 2,878,905 | 3/1959 | Langermeier | 138/96 T |
| 2,896,974 | 7/1959 | Bush | 277/208 |
| 2,999,699 | 9/1961 | Lafferty | 277/208 |
| 3,056,427 | 10/1962 | Higgins | 138/96 T |
| 3,573,871 | 4/1971 | Warner | 277/208 |
| 3,802,466 | 4/1974 | Panella | 138/89 |
| 3,814,276 | 6/1974 | Van Gordon et al. | 138/96 T |
| 3,993,102 | 11/1976 | Polster et al. | 138/96 T |
| 4,095,810 | 6/1978 | Kuhle | 277/208 |
| 4,492,666 | 1/1985 | Dreyfuss et al. | 138/96 T |
| 4,501,301 | 2/1985 | Snow et al. | 215/319 |
| 4,553,567 | 11/1985 | Telander | 138/96 T |
| 4,620,330 | 11/1986 | Izzi | 138/89 |

Primary Examiner—James E. Bryant, III
Attorney, Agent, or Firm—William F. Frank

[57] ABSTRACT

The present invention is a sewage clean-out line cover and removable cap made of Ultra High Molecular Weight Polyethylene. The interior of the cover carries a plurality of rows of upwardly inclined teeth, the rows being parallel and unconnectable to each other. The teeth comprising each row have a pitch to depth ratio of approximately 1:1. The ratio of the slope of the upper surface of the teeth to the lower surface is 1:1, thus providing a tip for installation over the open end of the upstanding clean-out pipe which tip is flexible for pushing the cover over the open end of the clean-out pipe due to the inherent lubricity of the UHMWPE but which resists removal of the cover by the tips folding over to increase friction against the clean-out pipe outer surface. The cover is usable with cast iron or PVC pipe or any other presently known material used to form sewage clean out pipes. A second embodiment of the present invention includes a magnet inserted in the upper surface of the cover and selectively may include an additional magnet into the upper surface of the removable cap.

14 Claims, 3 Drawing Sheets

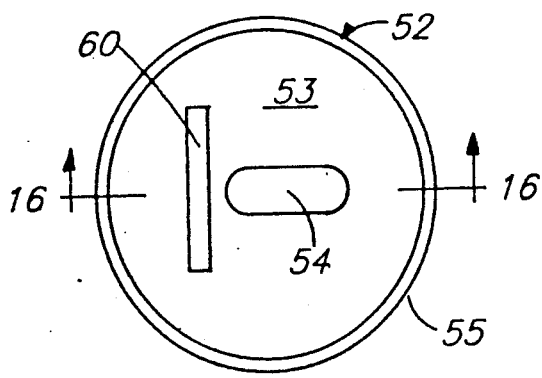
FIG. 14
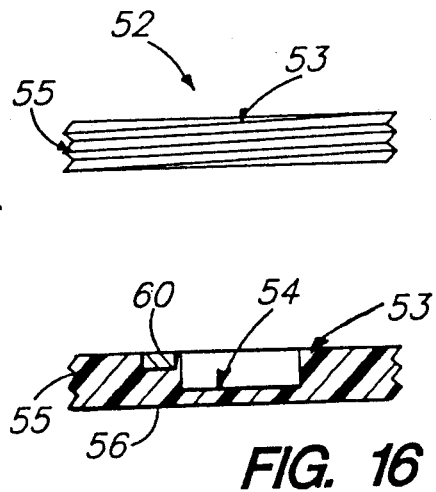
FIG. 15
FIG. 16
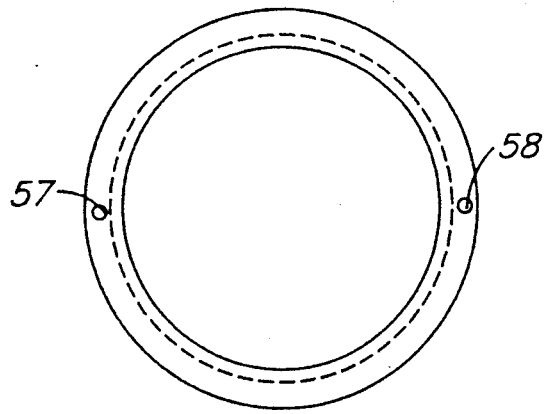
FIG. 17
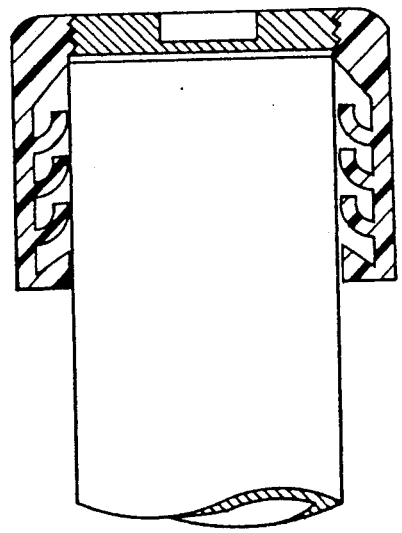
FIG. 12
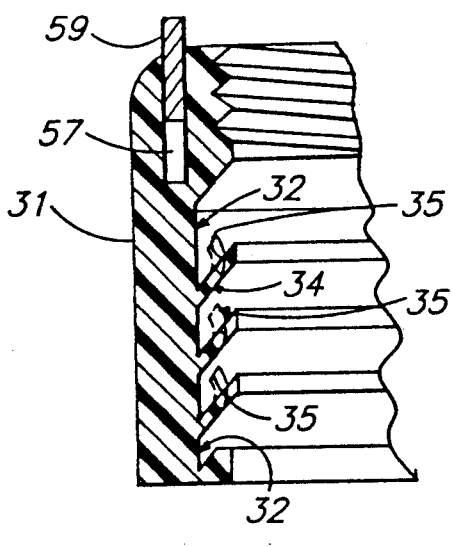
FIG. 18
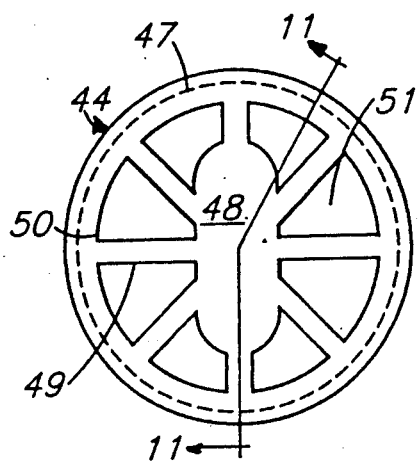
FIG. 13
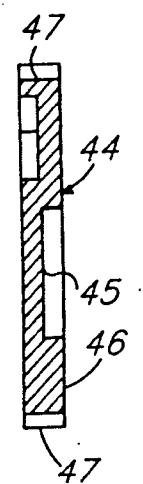
FIG. 11

SEWER LINE CLEAN OUT UNITS

This application is a continuation-in-part of Ser. No. 7/257,870, filed 14 Oct. 1988, and abandoned upon the filing of this application.

FIELD OF INVENTION

The present invention is in the general field of sewage disposal pipelines. More specifically, it is in the field of sewer line connections which provide access to sewer lines to remove any stoppage within such lines.

BACKGROUND OF THE INVENTION

The disposal of sewage from dwelling units and commercial establishments is two-fold. Primarily, there is the trunk sewer line which receives and transfers all sewage from whatever adjacent buildings discharge and the separate lines which transfer such sewage from each building to the primary or trunk sewage lines. Local regulations, be they relating to town, city, county or individual property owners, require that at the juncture of the property line and the town, city or county easement leading to the accepting trunk sewer line there will be provided a means of access to this juncture point.

In the past, such connecting sewage disposal lines were made of cast iron. At the juncture of the private (commercial) property line and the transversing property line of the governmental sewage disposal authority there was established an upstanding T-coupling. In the past, the aforesaid T-coupling terminated in an open ended pipe of cast iron for which a cover and openable cap was provided as shown and described in U.S. Pat. No. 3,802,466 to the present applicant. As described therein, after the final grading or sodding of the adjacent land was established, the cast iron upstanding pipe was cut to the desired height, a cast iron cylindrical cover with a force fitted gasket was driven over the open end of the upstanding cast iron pipe and a threaded cap was screwed into the cover. With the advent of PVC sewage pipe availability, the cast iron cover has been supplanted by a PVC cover which is adhesively secured to the upstanding PVC pipe from the PVC coupling in the sewage disposal line. The PVC cover may receive a PVC threaded cap or the conventional brass cap used with the cast iron installation.

It is to be understood that the sewage line connector discussed and described herein relates only to a sewage line clean out unit which enables the governmental agency concerned to clear a sewer line stoppage which is between that governmental property easement line and the connecting trunk sewer line. Any stoppage of a sewer line from a private property holder and the aforesaid juncture of the private property line and the governmental property line is not germane to the present application. The use of PVC sewage pipe and couplings is an economic advantage. The joining of pipes and couplings is easily done since adhesives are used for the connections in contrast to the need to couple the cast iron units by threaded cap plugs, use of heated lead for sealing and the like. The PVC is more economical as to production cost and ease of assembly. The problem with PVC clean out couplings, covers and caps is that PVC is fragile from a sharp blow, such as can be delivered by the blade of a lawn mower. When the PVC cap/cover is fractured, it is necessary to excavate the area around the PVC clean-out pipe/cover to a depth such that the fractured cover can be cut off, a union cohered to the clean-out pipe, a coupling pipe adhesively installed and a new cover/cap secured. Once the cover is fractured by such a blow, which is all too common, the upstanding pipe can be, or is, open. The open end of such pipe is conducive to children throwing rocks and other hard objects into the pipe and hence into the trunk sewer line. Cleaning out the line from the above-described property line juncture by self-cleaning due to flow from the private or commercial property or by the governmental agency of such self-cleaning is inadequate. In some instances it is possible to pull the clogging material back to the clean out pipe where the material may be removed mechanically. Usually, however, the clogging material is pushed into the trunk sewer line. The end result of such cleaning is that the obstructions enter the trunk sewer line and eventually come into contact with the pumps in the sewage treatment system. This non-sewage material either fouls or fractures the pumps.

Until the present invention, there was, and is, no known clean-out cover with caps more resistant to fracture and destruction, if not impossible to fracture from physical force. The present invention does not suffer from dimensional change due to an aqueous environment. It has an inherent self-lubricity which permits forming to exact interior diameters. The invention is chemically inert which means that no contamination or modification of the sewage passing therethrough will present problems in subsequent sewage treatment. The invention has such a low temperature integrity that it does not become brittle even at cryogenic temperatures.

SUMMARY OF THE INVENTION

The present invention is a sewage clean-out line cover and removable cap made of Ultra High Molecular Weight Polyethylene. The interior of the cover carries a plurality of rows of upwardly inclined teeth, the rows being parallel and unconnectable to each other. The teeth comprising each row have a pitch to depth ratio of approximately 1:1. The ratio of the slope of the upper surface of the teeth to the lower surface is 1:1, thus providing a tip for installation over the open end of the upstanding clean-out pipe which tip is flexible for pushing the cover over the open end of the clean-out pipe due to the inherent lubricity of the UHMWPE but which resists removal of the cover by the tips folding over to increase friction against the clean-out pipe outer surface. The cover is usable with cast iron or PVC pipe or any other presently known material used to form sewage clean out pipes. A second embodiment of the present invention includes a magnet inserted in the upper surface of the cover and selectively may include an additional magnet into the upper surface of the removable cap.

BRIEF DESCRIPTION OF THE DRAWINGS

The present invention is shown in the accompanying drawings in the preferred embodiment, said drawings not being restrictive to exterior shape and size.

FIG. 11 is a cross-sectional view of an alternative configuration of the cap for the cover of the present invention.

FIG. 12 is a cross-sectional view of the present invention showing the installation of the cover of the present invention on a clean-out pipe.

FIG. 13 is a plan view of the underside of the alternative cap configuration seen in FIG. 11.

FIG. 14 is a top plan view of a third alternative configuration of the cap seen in FIG. 6.

FIG. 15 is an elevation view of the cap seen in FIG. 14.

FIG. 16 is a elevation view in cross-section along plane 15—15 in FIG. 14.

FIG. 17 is a top plan view of the second embodiment of the cover of the present invention as seen in FIG. 4.

FIG. 18 is a cross-sectional view of the alternative embodiment seen in FIG. 16 as applied to the showing in FIG. 10.

DETAILED DESCRIPTION OF THE INVENTION

Figure 1:
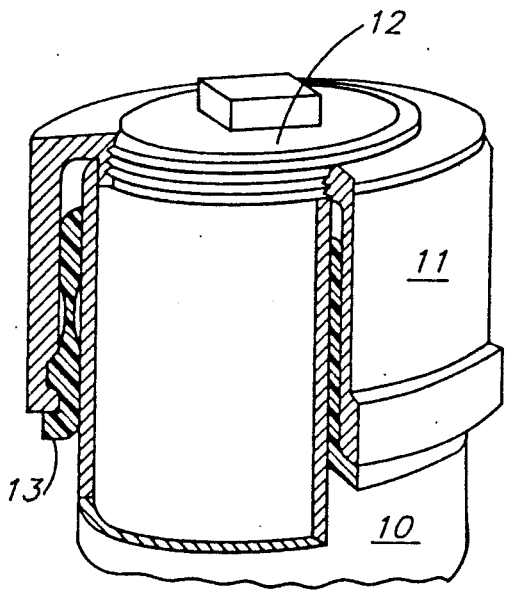
FIG. 1 is an elevation view in partial cross-section of the prior art using cast iron components.

FIG. 1 shows the cast iron clean-out pipe 10, the cast iron cover 11 and the cast iron cap 12. As can be seen, the cover 11 is threadedly attached to pipe 10 and the cap 12 is threadedly inserted into cover 11.

Figure 2:
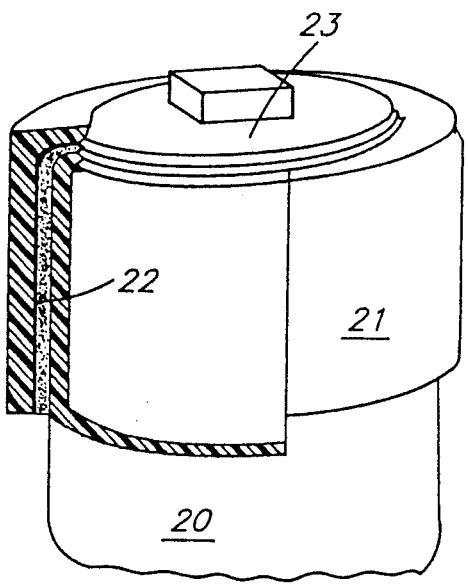
FIG. 2 is an elevation view in partial cross-section of the prior art using PVC components.

FIG. 2 shows a clean-out pipe 20 of PVC, a cover 21 adhesively secured to pipe 22 and a cap 23 threadedly inserted into cover 21.

Figure 3:
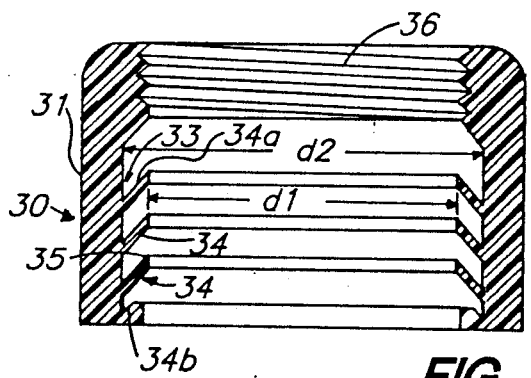
FIG. 3 is an elevation view of the cover of the present invention in partial cross-section.
Figure 9:
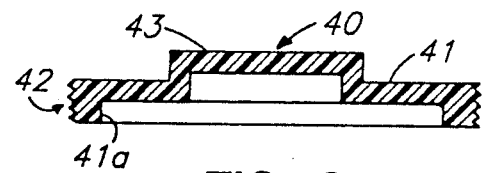
FIG. 9 is a cross-sectional view of the cap of the present invention.
Figure 7:
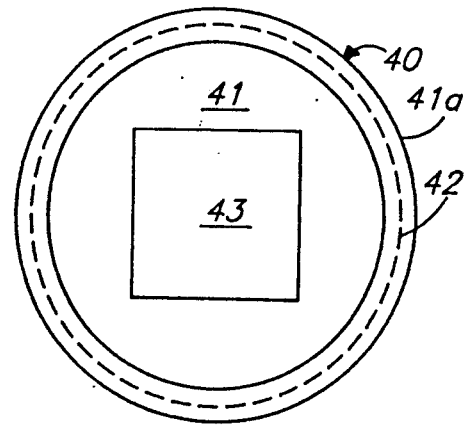
FIG. 7 is a bottom plan view of the cap of the present invention.
Figure 5:
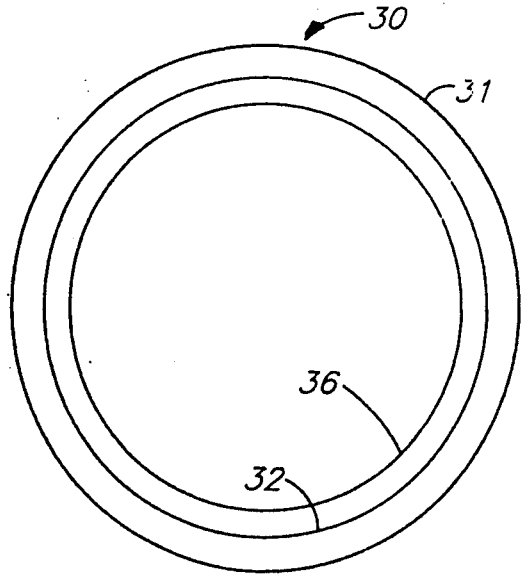
FIG. 5 is a bottom plan view of the cover of the present invention.
Figure 6:
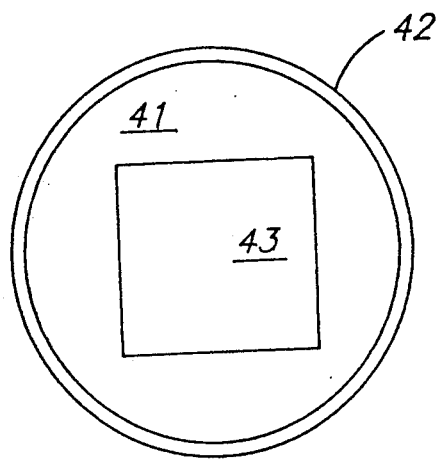
FIG. 6 is a top plan view of the cap of the present invention.
Figure 8:
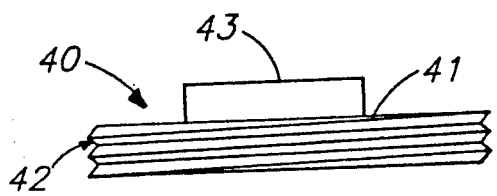
FIG. 8 is an elevation view of the cap of the present invention.
Figure 4:
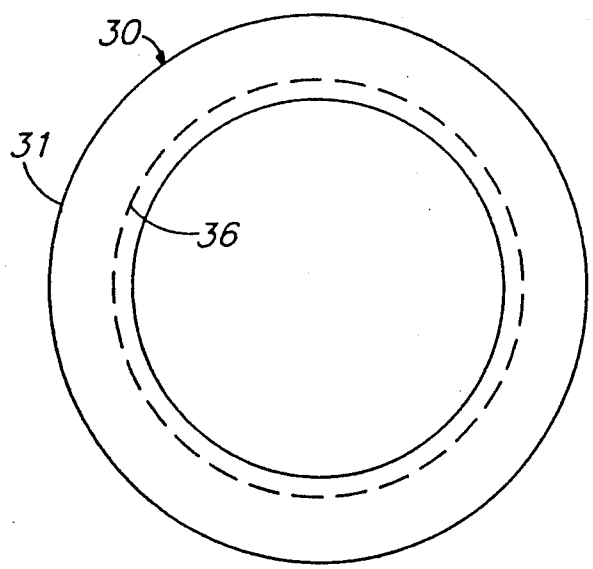
FIG. 4 is a top plan view of the cover of the present invention.

FIGS. 3-5 show a clean-out pipe cover 30 of the composition UHMW Polymers) of the present invention which can be used with cast iron pipe threaded or unthreaded or PVC pipe. Cover 30 is cylindrical having an outer surface 31 and an inner surface 32. Inner surface 32 carries a plurality of annular grooves 33 and a plurality of annular ridges 34, each ridge terminating in a flexible tip 35. The upper portion of cover 30 carries an interiorly threaded portion 36. It is to be noted that each ridge 34 is angled upwardly. This facilitates placing cover 30 on the clean-out pipe and makes removal of cover 30 substantially impossible.

FIGS. 6-9 disclose one form of a cap for the cover of the present invention. Cap 40 comprises a circular disc 41 with depending edges 41a which carry threaded portion 42 which matches and accepts threaded portion 36 of cover 30. The interior portion of cap 40 has an upstanding lug 43. Lug 43 is rectilinear in form and can be grasped by an appropriately sized wrench or can be moved by striking with a wedge and hammer.

It will be recognized that the circular disc as seen in FIG. 11 and FIG. 13 is an alternative form of the cap of the present invention and may be made of suitable material other than that of the preferred embodiment of UHMWP. As seen in FIGS. 11 and 13 this cap embodiment 44 is easily distinguished from the cap of FIGS. 6-9 by the absence of the lug 43. In place of a lug, a generally rectangular recess 45 is formed in the upper surface 46 of cap 44. The cap 44 has threaded edges 47 to mate with threads 36 of the cover 30. The underside of cap 44 as seen in FIG. 13 shows the under surface 48 of recess 45 and a plurality of ribs 49 extending radically outwardly to a rim 50 which carries the threaded edges 47, thereby forming hollow spaces 51. This cap configuration is deemed suitable if the cap is to be made of cast iron or brass to reduce weight.

The presence of lug 43 on a cap makes insertion and removal of a cap somewhat easier than a recess in the cap surface such as seen in FIG. 11 at 45. However, if the cover is installed at ground level the lug can be subject to damage from a lawn mower or other surface touching devices. The lug also can be cause for tripping a person. Therefore it is preferred to have caps with flat upper and lower surfaces and a recess for tool insertion for inserting or removing the cap.

A preferred form of such a cap is shown in FIGS. 14-16 wherein the cap 52 has flat upper and lower surfaces 53 and 56 respectively with a recess 54 formed in surface 53 and threaded edges 55 to engage threads 36 of cover 30.

Sewer line clean-outs such as have been described herein are often buried as a result of landscaping or the need for fill earth and similar ground removing projects. Since the burial depth of a clean-out cover can make locating the clean-out by probing it is desirable to be able to locate the clean-outs by metal detectors or magnetometers. With cast iron clean-outs such is easily accomplished. Plastic sewer lines are a problem unless a metal cap is inserted into the plastic clean-out cover. The embodiment of the present invention as seen in FIGS. 17 and 18 allows the use of plastic clean-out covers and caps. As seen in FIG. 17 a vertical cylindrical recess 57 is formed in the upper surface of cover 30 and extends down into wall 31. An additional recess may be formed in the upper surface as indicated in phantom lines 58. Into the recess a cylindrical magnet 59 is force fitted. Tests indicate that a single magnet is adequate. This concept can be reinforced if desired by forming a longitudinal recess 60 in a cap 52 for the cover and force fitting a appropriately sized magnetic bar into the recess.

Figure 10:
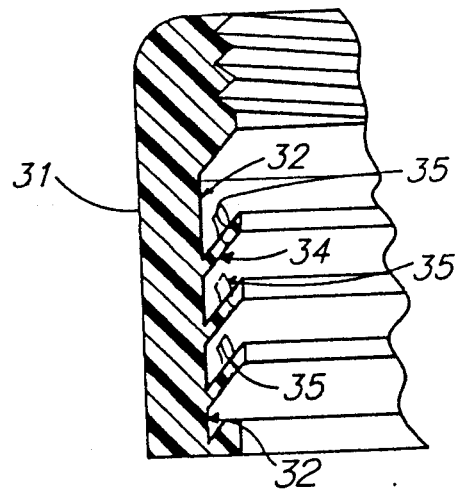
FIG. 10 is a partial cross-sectional view of the ridges and grooves in the body portion of the present invention.

Referring to FIGS. 3 and 10, it is to be noted that upper surface 34a of each ridge 34 is of the same length as its associated lower surface 34b in a ratio of 1:1. The inner diameter d1 of cover 30 in the region of the annular ridge is slightly less than the inner diameter d2 of cover 30 above the region carrying the annular grooves 33 and ridges 34. As can be seen in FIG. 12, the tips 35 of ridges 34 are curved upwardly very slightly when cover 30 is in place on the clean-out sewer pipe P. Any attempt to pull cover 30 off pipe P will cause the tips 35 to bear more strongly against the outer surface of pipe P by reducing the upward curvature of the tips.

The present invention eliminates the need for friction gaskets to hold a cast iron cover to the open end of a clean-out pipe as well as the use of adhesives to secure a PVC cover to a PVC clean-out pipe. The present invention also eliminates the problem of reaction between the cast iron cover and cap or brass cap because of rainwater and melting snow.

What is claimed is:

1. An assembly to encompass and permanently enclose the open end of a vertical clean-out pipe in a sewage draining system comprising:

a cylindrical cover of integral one piece construction having an interior diameter at its lower end substantially equal to the exterior diameter of said vertical clean-out pipe, a diameter of the opposing open end of said cover being less than said exterior diameter of said pipe, the interior surface of said opposing open end carrying a threaded portion, a mid-portion of the interior cylindrical surface of said cover having formed thereon and extending inwardly and upwardly from said surface a plurality of spaced apart parallel ridges which ridges terminate in upwardly inclined teeth, the ends of said teeth forming flexible tips to securely and fictionally engage the outer surface of said pipe with which said teeth are in contact; and a cap threadedly inserted within said threaded open end of said cover.

2. The assembly according to claim 1, wherein said cover is made of a polymer having an inherent lubricity, which is chemically inert, is stable at temperatures from ambient to cryogenic and is resistant to fracture by physical force.

3. The assembly according to claim 2, wherein said cap is formed from a polymer identical to that from which said cover is formed.

4. The assembly according to claim 1, wherein said cap is formed from a brass composition.

5. The assembly according to claim 1, wherein the ratio of the length of the upper surface of each tooth to the length of the lower surface of each tooth is 1:1.

6. The assembly according to claim 1 wherein said cap has spacedly opposed flat upper and lower surfaces, said upper surface having a first recess therein for receiving a tool to threadedly engage/disengaged said cap and cover.

7. The assembly according to claim 6 wherein said upper surface has a second recess into which a magnetic rod is fitted as a means to locate said assembly by a magnetometer.

8. An assembly to encompass and permanently enlose the open end of a vertical clean-out pipe in a sewage draining system comprising:

a cylindrical cover of integral one piece construction having an interior diameter at its lower end substantially equal to the exterior diameter of said vertical clean-out pipe, a diameter of the opposing open end of said cover being less than said exterior diameter of said pipe, the interior surface of said opposing open end carrying a threaded portion, a mid-portion of the interior cylindrical surface of said cover having formed therein extending inwardly and upwardly from said surface a plurality of spaced apart parallel ridges which ridges terminate in upwardly inclined teeth, the ends of said teeth forming flexible tips to securely and frictionally engage the outer surface of said pipe with which said teeth are in contact;

a cap threadedly inserted within said threaded open end of said cover; and at least one vertical recess formed within said opposing end of said cover and a magnetic rod fitted into said recess as a means to locate said assembly by use of a magnetometer.

9. The assembly according to claim 8 wherein said cap has spacedly opposed flat upper and lower surfaces, said upper surfaces having a first recess therein for receiving a tool to threadedly engage/disengage said cap and cover.

10. The assembly according to claim 9 wherein said upper surface has a second recess into which a magnetic rod is fitted as a means to locate said assembly by use of a magnetometer.

11. The assembly according to claim 8 wherein said cover is made of a polymer having an inherent lubricity, which is chemically inert, is stable at temperatures from ambient to cryogenic and is resistant to fracture by physical force.

12. The assembly according to claim 11 wherein said cap is formed from a polymer identical to that in which said cover is formed.

13. The assembly according to claim 8 wherein said cap is formed from a conventional brass.

14. The assembly according to claim 8 wherein the ratio of the length of the upper surface of each tooth to the length of the lower surface of each tooth is 1:1.

* * * * *